United States Patent

[11] 3,596,315

[72] Inventors Shinsuke Yoshikawa;
 Yuji Sawa, both of Fukushima-Ken, Japan
[21] Appl. No. 851,289
[22] Filed Aug. 19, 1969
[45] Patented Aug. 3, 1971
[73] Assignee Kureha Kagaku Kogyo Kabushiki Kaisha
 Tokyo-to, Japan
[32] Priority Aug. 21, 1968, Aug. 22, 1968, Aug. 22, 1968
[33] Japan
[31] 43/59193, 43/59516 and 43/59515

[54] APPARATUS FOR THE CONTINUOUS MANUFACTURE OF THERMOPLASTIC RESINOUS CONTAINERS
 2 Claims, 17 Drawing Figs.
[52] U.S. Cl. .................................................. 18/5 BT, 18/5 BP, 18/20 B
[51] Int. Cl. ................................................ B29d 23/03
[50] Field of Search ................................... 18/5 BM, 5 R, 4 S, 5 BB, 5 BE, 5 BP, 5 BZ, 5 BR, 5 BN, 5 BT, 5 BS, 20 B

[56] References Cited
 UNITED STATES PATENTS

| | | | |
|---|---|---|---|
| Re. 23,564 | 10/1952 | Hobson ......................... | 18/5 BZ X |
| 2,750,625 | 6/1956 | Colombo ....................... | 18/5 BP UX |
| 3,016,669 | 1/1962 | Grosclaude ................... | 18/5 BF X |
| 3,079,637 | 3/1963 | Marzillier ..................... | 18/20 B X |
| 3,423,495 | 1/1969 | Bachner ........................ | 18/5 BF X |
| 3,525,123 | 8/1970 | Cines et al. .................... | 18/5 BM |

*Primary Examiner*—J. Spencer Overholser
*Assistant Examiner*—Michael O. Sutton
*Attorney*—Wenderoth, Lind & Ponack

ABSTRACT: Apparatus for the continuous manufacture of containers from a thermoplastic resin, comprising three rotaries; a parison-transferring rotary, a blow-molding rotary and a rotary for removal of the product and for pinhole test. The first rotary is arranged as a rotary-type transferring device between the molding machine and the extruder, in which the continuously extruded tubular parison is continuously stretched and cut to a desired length, and this cut parison, after rotation thereof by 90°, is inserted into one of the metal molds in the point of contact with the second rotary being a blow molding rotary, whereby the waste of material as in the conventional rotary blow molding machines can be eliminated. The second rotary is equipped with several or dozens of sets of metal molds and their tightening means. These metal molds are synthetic resin blow-molding ones in which sealing of the product and utilization of the material can be performed efficiently. In this case, two sets of split molds are combined with their container bottom-forming portions opposed to each other and a blow pin is arranged between said bottom forming portions so as to form two containers at a time, and a pressing mechanism for closing the top of the container and adapted to be movable at right-angles to the split face of the mold is provided, thus improving the operational efficiency and reducing remarkably scraps in the ranges of the top and bottom of the container. Normally, in the case of resins from which narrow-necked containers cannot be made by blow molding and biting off as in the case with vinylidene chloride, only large necks than the diameter of the parison can be formed. Of course, it is possible to make the diameter of the neck substantially equal to or smaller than that of the parison by arranging any guide at the position of the neck, but this leads to reduction of the yield by an amount corresponding to the width of the guide. According to the present invention, the parison is pressed in a direction perpendicular to the split mold, thereby to realize the same effect as that of the guide and moreover to enable the container to be sealed tight enough to prevent penetration of bacteria. In order to facilitate sealing of the container at the bottom immediately after blow molding, high frequency electrodes may be provided at the bottom-forming portion of the metal mold. The so produced container is taken out from the mold by grasping it at the portion grasped for transfer from the first to the second rotary, as soon as the mold is opened at the point of contact with the third rotary. Then, the unnecessary portion between the bottoms of two containers is removed by a bottom cutter while air-cooling them and at the same time the body of the sealed container is compressed with a certain pressure to check it for freedom from pinholes. Finally, the finished containers are sorted as acceptable or not an are made to fall down.

SHINSUKE YOSHIKAWA and
YUJI SAWA,
INVENTORS

BY Wenderoth, Lind & Ponack
Attorneys

SHINSUKE YOSHIKAWA and
YUJI SAWA,
INVENTORS

APPARATUS FOR THE CONTINUOUS MANUFACTURE OF THERMOPLASTIC RESINOUS CONTAINERS

BACKGROUND OF THE INVENTION

In the conventional art of forming containers of thermoplastic resin in a high efficient manner, the material is extruded by an extruder into a continuous pipe (hereinafter referred to as "parison"), the thus formed parison is transported into a blow-molding machine, where it is formed into desired forms in a metal mold, and then the formed product is removed from the metal mold, with for instance, knockout pins to fall down.

When vinylidene chloride resin is to be formed in such a blow-molding machine, the parison must be stretched longitudinally prior to blow molding, thereby to improve the material strength of the product. In a rotary blow-molding machine used hitherto for accomplishing this purpose, several sets of blow-molding split molds are arranged at equal intervals around a rotary base adapted to rotate about a vertical or horizontal axis, wherein the parison extruded in the circumferential direction of said base is pinched at one end thereof by a pair of nippers associated with said metal mold to be stretched by rotation of said base, and then it is sealed in the metal mold by closing this mold and blown and formed by blowing a fluid into the parison. This blow-molding machine is simple in its construction and operated in cooperation with an extruder, thus permitting the extruded parison to be immediately stretched and blow molded in succession, but it has the following disadvantages:

1. Since the blow-molding metal molds arranged around the base must be spaced from one another from constructive point of view, the section of parison between two adjacent molds is of no use, whereby the rate of material utilization is decreased. Especially, in the case of vinylidene chloride, it is difficult to reuse the scrapped material, thus leading to an economical disadvantage;
2. When a rotary molding machine is to be used for manufacture of bottles or the like different sizes by exchanging the metal molds, the waste of material is increased with smaller metal molds;
3. It is difficult to automatize the process of separating the molded product from the metal mold and the trimming process of cleanly removing the portion of parison pinched by the closed mold. In the case of polyethylene, the molded products can be taken out as a chainlike train and then trimmed. Such a method cannot be, however, applied for vinylidene chloride, for the containers made thereof will be subject to deformation.
4. When bottles or other containers are manufactured from thermoplastic synthetic resins, particularly from highly flexible ones such as polyethylene and vinylidene chloride, it is necessary to seal them for the purpose of preventing deformation thereof during transportation and penetration of bacteria and foreign matters thereinto. That is, it is usual that the containers are transported in the sealed condition and cleanly cut at the port just before it is filled with contents. Hence, for the manufacture of such sealed containers as described above the molded product must be welded at the bottom thereof by high frequency heating or sealed at the blow pinhole by heating or high frequency welding while being in the metal mold or after separated therefrom.

SUMMARY OF THE INVENTION

A principal object of the present invention is to solve the above-mentioned problems and to provide an improved apparatus capable of performing successively longitudinal stretching of the parison blow-molding, sealing of the molded product, separation of the product from the metal mold, and pinhole testing of the product.

The above object and other objects of the invention have been attained by the apparatus comprising a parison transferring rotary adapted to take the parison continuously from an extruder, said rotary comprising a base rotating around its center axis, several support rods projected laterally from said base and arranged at equal intervals around said base, a tube fitted loosely on each of said support rods and controlled for movement along said support rod and for rotation by 90° with respect to rotation of said base, connecting pieces fixed to the outer end of said tube so as to form a T-shaped, holding means comprising two pairs of nippers secured to both ends of said connecting pieces and adapted to be opened and closed in relation to the rotation of said base, and cutting blades provided on one of said pairs of the nippers located forward with respect to the direction of rotation of said base, whereby said forward pair of the nippers are made to grasp the parison to stretch it with the rotation of said base for moving said nippers at a linear velocity higher than that at which the parison is extruded from said extruder and then the backward pair of nippers nips the parison and at the same time as this nipping the forward pair of nippers of the succeeding parison-holding means grasps the parison, said cutting blades being arranged so that the parison is cut off at a position between said both pairs of nippers, and said parison holding means being constructed and arranged in such a manner that said holding means rotates by 90° after said cutting of the parison thereby to bring the cut and stretched parison as held as above into parallel to the rotating axis of said base and to insert it into one of two-piece split metal molds of the following blow-molding rotary, said molds being mounted in parallel to said rotating axis; and a blow molding rotary comprising a rotating disc, several tightening devices arranged at equal intervals around said disc, said tightening device including said split mold constructed to have a form obtained by joining bottom portions of two containers, a blow pin adapted to be inserted between the bottoms of two containers to be formed, and nippers mounted on both ends of one split of said split mold in the direction at right angle with the split surface of the mold, said nippers being adapted to open when the mold is opened and close when the mold is closed thereby to compress the parts of the parison projecting from the ends of the mold; and means adapted to rotate synchronously and continuously said two rotaries.

The above objects and characteristic feature and function of the invention will be clearly understood by the following description in conjunction with the accompanying drawings, in which the same or equivalent numbers are designated by the same reference numerals.

BRIEF DESCRIPTION OF THE DRAWINGS

FIG. 13($a$) and ($b$) are, respectively, a plan view of the bottom cutter opened and a plan view of that closed;

DETAILED DESCRIPTION OF THE INVENTION

The present invention will be described hereinbelow in connection with one embodiment of the invention.

Figure 1:
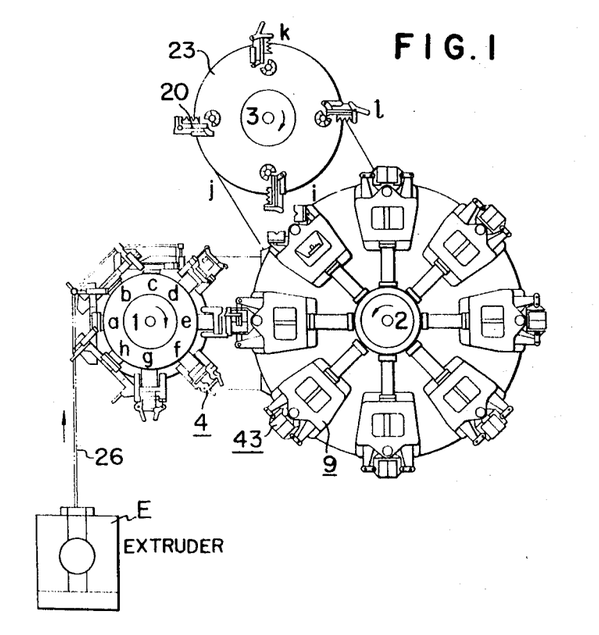
FIG. 1 is a plan view of the whole parts of an apparatus according to the present invention.
Figure 2:
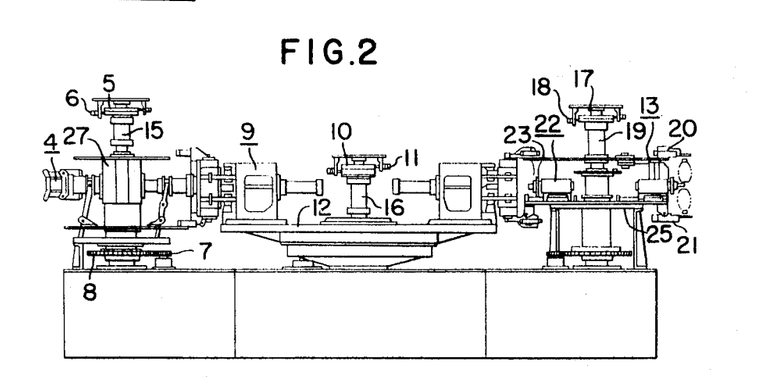
FIG. 2 is a front elevational view of the apparatus of FIG. 1.
Figure 3:
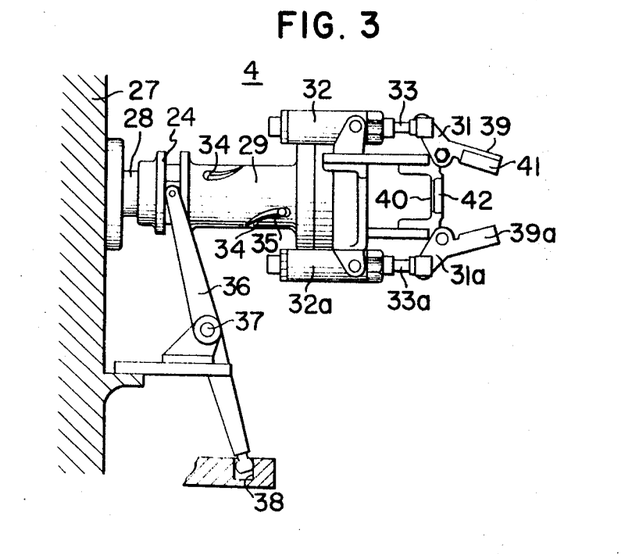
FIG. 3 is a view of a parison holder of the apparatus of FIG. 1.

Referring to FIGS. 1 and 2, the apparatus according to the present invention comprises three rotaries. The first rotary 1 comprises a base 27 adapted to rotate about its vertical axis and having 8 sets of parison holders 4 therearound, said holder being illustrated in detail in FIGS. 3 and 4. A tube 29 of the holder 4 is loosely fitted on a support rod 28 fixed to the side of the base. Secured to the other end of the tube 29 is a connecting piece 30, which carries on both ends two pairs of nippers 31 and 31a. The parison is held or released by the nippers in such a manner that movable jaws 39, 39a are pressed against or separated from the fixed ones 40, 40a by means of piston rods 33, 33a operated by air cylinders 32, 32a. Cutting blades 41 and 42 are provided on the jaws 39 and 40 located forward in the direction of rotation of the base 27, so that the parison is cut off at the same time when the jaws 39 and 40 nip it therebetween. Formed in the tube 29 is a cam slot 34, into which a pivot 35 fixed to the support rod 28 is engaged. A lever 36 pivoted to the base 27 at a pivotal shaft 37 is engaged at its one end in an annular groove 24 formed in the tube 29 and at its other end in a fixed guide groove 38. This first rotary is electrically energized through a slip ring 5 and a brush 6 and controlled through limit switches and magnetic valves which are not shown. Compressed air is supplied through a rotary joint 15.

Figure 5:
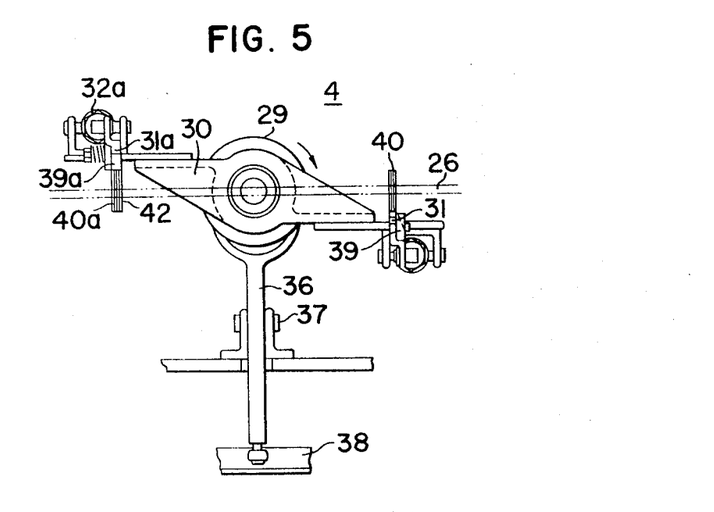
FIG. 5 is a view seen from the right of FIG. 3.

The parison 26 continuously extruded from the extruded E is conveyed in a direction tangential to the circle of rotation of the holder 4 rotating together with the base 27, as shown by the arrow of FIG. 1, and the base is rotated in such a way that the linear velocity of the holder 4 exceeds the velocity of extrusion of the parison. Now, the first rotary 1 operates as follows:

1. The parison 26 is cut off at its forward end when it is nipped by the forward pair of nippers 31a (left in FIG. 5). In this state, the nippers 31 are not yet at work.

2. The parison is stretched with rotation of the base 27, because the linear velocity of the nippers 31 is higher than that at which the material is supplied, and the holder 4 reaches the position a of FIG. 1.

3. Then, the backward pair of the nippers 31 are closed thereby to hold the parison stretched between the nippers 31 and 31a.

4. As soon as the backward pair of the nippers 31 of the holder 4 in the position a are closed, the forward pair of the nippers 31a of the holder in the adjacent position h are closed thereby to cut off the parison between said nippers of said both holders and the holder 4 in the position h moves to the position a, thereby to stretch the parison as explained before. As the base 27 rotates, these operations are repeated in the individual holders one after another.

Figure 4:
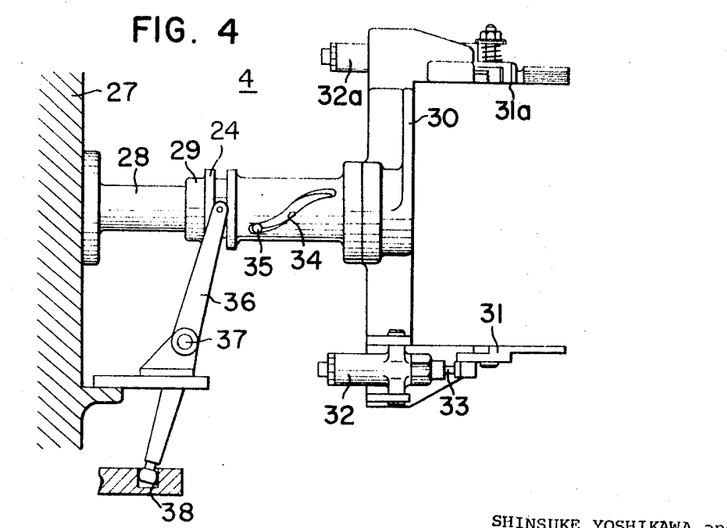
FIG. 4 is a side elevational view of the parison holder of FIG. 3, said holder being in a state turned by 90°.

5. While the holder 4 carrying the stretched parison is moving from c to d, the lever 36 moves from the position of FIG. 3 to that of FIG. 4 under the action of the guide groove 38, thereby to extrude the tube 29 along the support rod 28, whereby the tube 29 is turned by 180° in the direction of arrow in FIG. 5 owing to engagement of the cam slot 34 with the pivot 35, thus bringing the holder 4 to its longitudinal position as shown in FIG. 4.

6. When the longitudinally positioned holder 4 reaches the position e, it encounters one of eight sets of tightening devices 9 arranged around the second rotary 2 which has rotated synchronously in the direction of arrow thereof, where the parison is inserted into the opened metal mold 43. Upon insertion of the parison into the metal mold 43, this metal mold is closed, thereby to pinch the stretched parison therein. Subsequently, the nippers of the holder 4 are opened to release the parison and then transfered toward the position f.

7. The holder 4 which has released the parison therefrom turn again by 90°, during its transference from the position g to h, in the opposite direction through the mechanism comprising the guide groove 38, lever 36, cam slot 34 and pivot 35. Thus, it gets ready to hold the next parison.

In this way, the extruded tubular parison is successively stretched, held and transfered to the second rotary by means of the eight sets of parison holders one after another.

Figure 11:
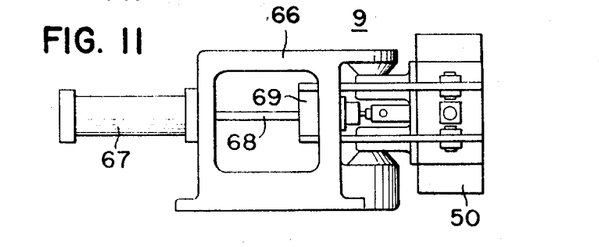
FIG. 11 is a side elevational view of the mold-tightening device which encloses mold therein.
Figure 12:
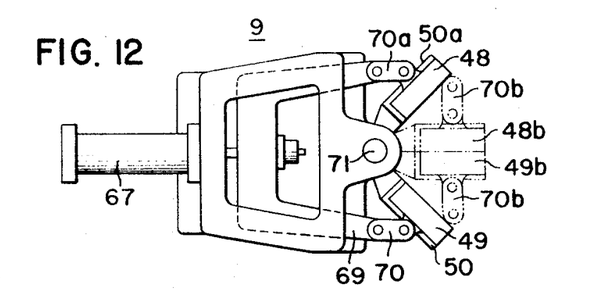
FIG. 12 is a plan view of the device of FIG. 11.

The tightening device 9 of the second rotary is so constructed as shown in FIGS. 11 and 12. Secured to this device is a two-piece split mold 43 in a vertical plane, said mold being adapted to open or close about a fulcrum 71. A pneumatically operatable air cylinder 67 is secured to a frame 66. When the cylinder 67 receives a signal in a predetermined position, a fork 69 is pushed by a piston rod 68, thereby to press the mold parts 48 and 49 through connecting plate 70 and 70a, thus closing the mold into the positions 48b and 49b. At this state, the connecting plates 70 and 70a take the positions 70b and are fixed there by toggling action. After these operations, the cylinder 67 is actuated in the opposite direction by a compressed air caused by another signal, thereby to return the piston rod 68 and fork 69, thus opening the metal mold 48, 49.

The inner construction of the metal mold, which forms an important part of the present invention, will be now explained. In FIGS. 6 to 10, numerals 48, 49 and 48a, 49a designate respectively two sets of metal molds adapted to form a bottle. They are mounted on coupling plates 50 and 50a with their bottom forming portions opposed to each other. There are provided a high frequency anode 52 insulated from the molds and coupling plates through an insulator 51 and a cathode 54 which is movable in a vertical direction.

A rod 55 extends from the cathode 54, to the end of which a seat plate 56 is secured. A compression spring 57 is inserted between the seat plate 56 and the coupling plate 50a, so that the cathode 54 normally comes down to form a gap S against the anode 52. The anode 52 and cathode 54 and the insulator 51 define the contour of the bottom of the bottle. A blow pin 53 is inserted from between both electrodes 52 and 54 in such a manner that it pierces the parison pinched by the mold. As the coupling plates 50 and 50a are pivotally mounted at a pivot 62, the blow molds 48, 49, and 48a, 49a are swingable together with the coupling plates 50 and 50a to be opened or closed.

Figure 9:
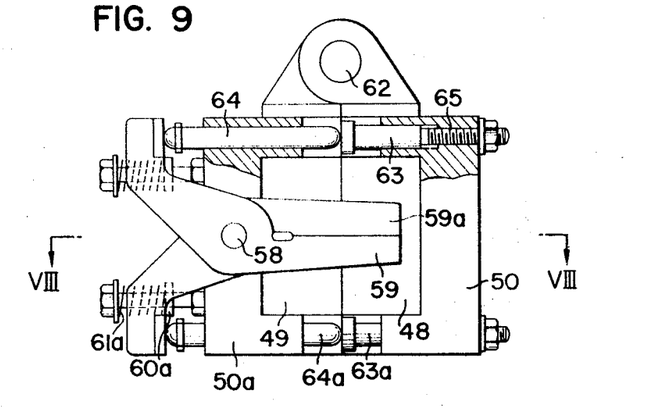
FIG. 9 is a side elevational view of the metal mold viewed from the right of FIG. 8.
Figure 10:
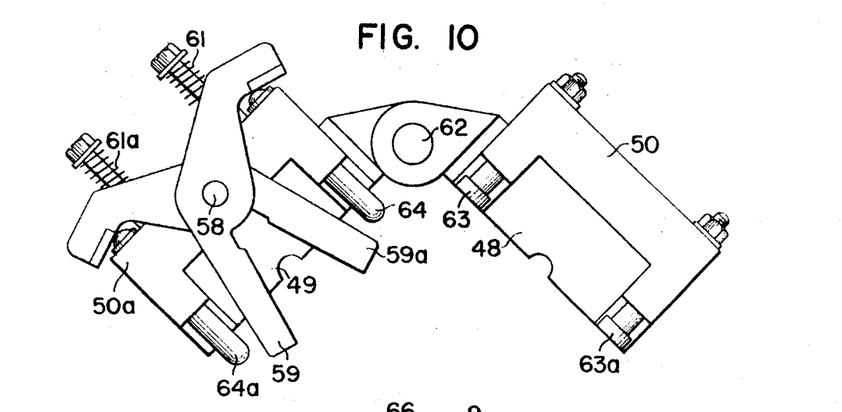
FIG. 10 is a side elevational view of the opened metal mold.

Two pairs of nippers 59 and 59a adapted to swing in a direction perpendicular to the split face of the mold are mounted on both ends of the coupling plate 50 and 50a at respective pivot 58. The nippers 59 and 59a adapted to nip the part of parison projecting from the mold are opened together with the mold when this mold opens as shown in FIG. 10, because the compression springs 61 and 61a press the nippers 59 and 59a through metal pieces 60 and 60a. On the other hand, when the mold is closed, push rods 64 and 64a are pressed by push pieces 63 and 63a, thereby to push the roots of the nippers in a direction opposite to forces of the springs 61 and 61a, thus closing the nippers as shown in FIG. 9. By adjusting the positions of the push pieces 63 and 63a in the coupling plate 50 by means of their threaded parts 65, the strength with which the nippers 59 and 59a pinch the parison projected from the mold can be adjusted.

Thus, when he mold with a tubular parison enclosed therein is closed, the part of parison projecting from the ends of the mold is pinched by the nippers 59 and 59a, so that the parison is blow molded into the shape of the mold when compressed air is injected through the blow pin 53 pierced into the parison from between the electrodes 52 and 54.

After degassing through a hole made by the blow pin 53, the seat plate 56 is depressed to lower the cathode 54 and press the parison therewith, whereby high frequency welding is attained, thus sealing the bottle at its bottom.

In the case of parisons made of a thermoplastic resin, sealing of said parison can be possible in a considerable extent by only pressing the parison before completion of its crystallization. Hence, the neck of the bottle pressed by the nippers 59 and 59a is sealed enough to withstand subsequent operations.

The bottom of the bottle is also sealed enough to withstand transportation even when it is completely sealed in a separate process, i.e. no electrode is provided in the mold.

Figure 7:
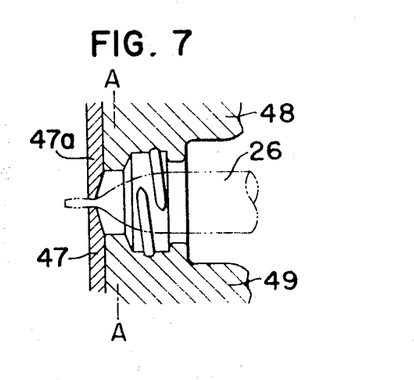
FIG. 7 is a sectional view similar to FIG. 6 in the case of the present invention.
Figure 8:
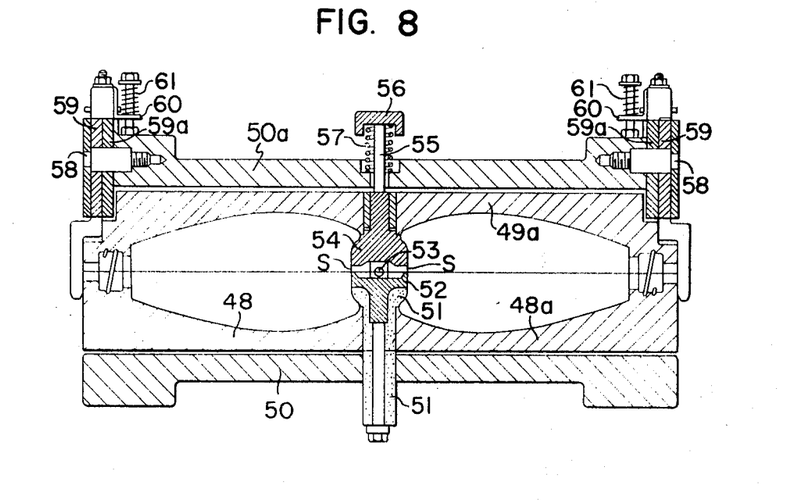
FIG. 8 is a vertical sectional view taken along the line VIII—VIII in FIG. 9, of the metal mold according to the present invention.

When the neck of the bottle is pressed in this way, the part of material cut off when the bottle is filled with contents and scrapped is very slight, i.e. only the part on the left side of the line A–A in FIG. 7 is wasted.

Figure 6:
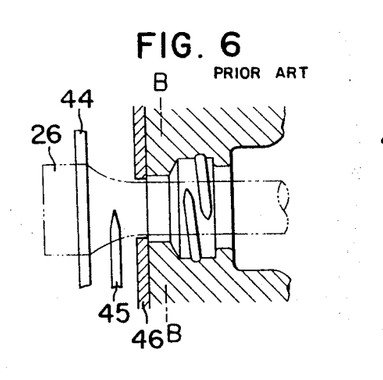
FIG. 6 is a sectional view showing molding state of the neck of a bottle being molded by a conventional method.

In the known art, as shown in FIG. 6, the end of parison 26 is pressed by a pressure piece 44 and a guide 46 is arranged at the neck so that a blow pin 45 is inserted into the parison at a portion between the pressure piece 44 and the guide 46 for bow molding, so that the hole made by the blow pin must be sealed after molding. In this case, the part of parison on the let side of the line B–B is cut off and scrapped.

The tightening device 9 and the split mold 43 shown in FIG. 1 have been described in detail, but in the following the invention will be described in accordance with the flow of the parison. Upon transference of the parison from the first rotary 1 to the second rotary 2 at their contact point $e$ and immediately thereafter the mold closes. Then, while the table 12 rotates continuously in the direction of arrow, the process of blowing, degassing and bottom sealing are effected in succession and, when the mold reaches the position $i$, the mold opens to transfer the molded product to the third rotary 3. The second rotary 2 is, like the first one, energized through a slip ring 10 and a brush 11 fed with compressed air through a rotary joint 16.

Figures 13A, 13B:
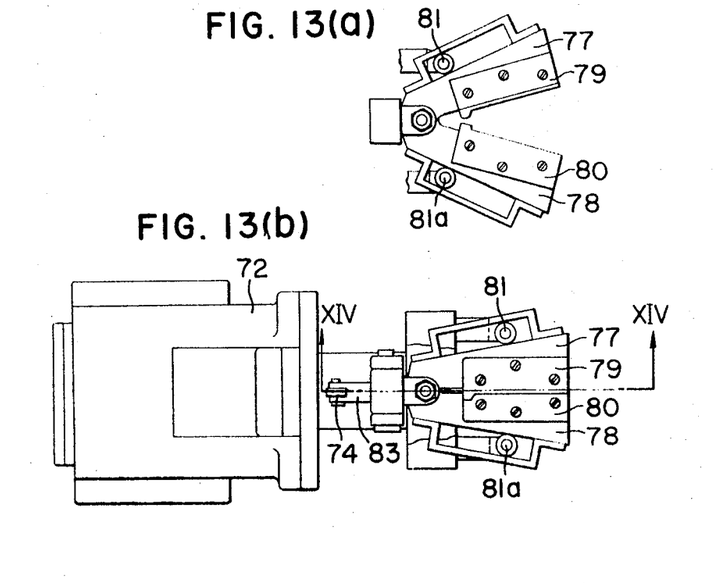
Figure 14:
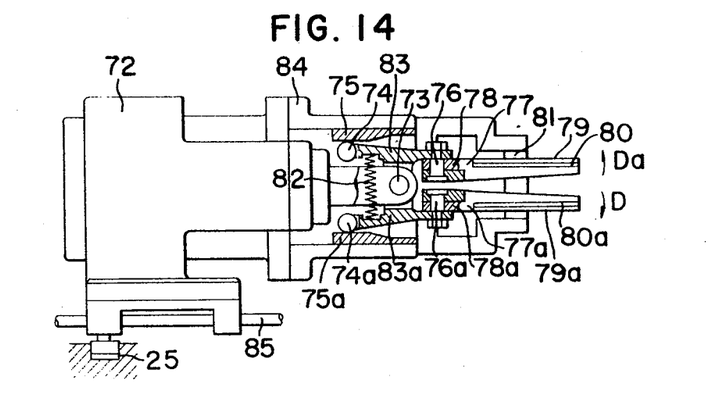
FIG. 14 is a sectional view taken along the line XIV—XIV of FIG. 13.
Figure 15:
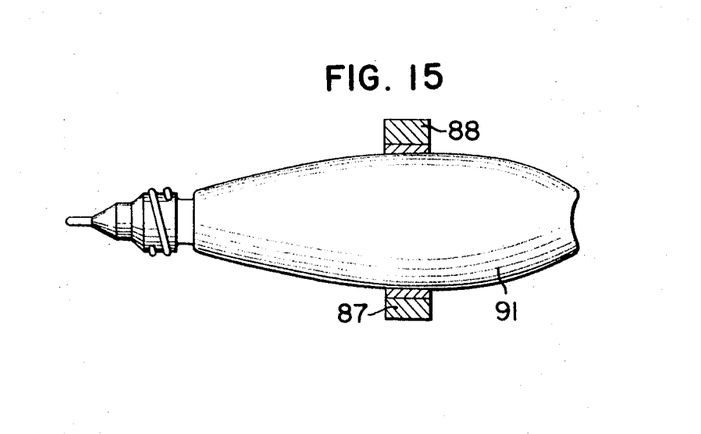
FIG. 15 is a schematic view of a sealed container while being compressed.

The third rotary 3 comprises a lower base plate 24 and an upper base plate 23 having four sets of nippers 20, 21, respectively, said nippers being adapted to be able to open and close with signals by electric energy supplied through a slip ring 17 and a brush 18 and by compressed air supplied through a rotary joint 19. In the center of the rotary, four sets of bottom cutters 22 are provided. These cutters are movable in the transverse direction (right to left or vice versa in FIG. 2) by means of a cam 25. In pairs with the bottom cutters 22, four sets of pinhole testers 13 adapted to be moved by means of a cam 14 are arranged. Measures adapted to avoid interference of these members with the metal molds 43 being in particular positions are provided. The construction of the bottom cutter 22 is shown in detail in FIGS. 13 and 14. Pivotally mounted on a pivot 73 fixed to the main body 72 are two sets of connecting plates 83 and 83a provided at one end with axles 74 and 74a and at the other end with blade-mounting plates 77, 77a and 78, 78a through pivots 76 and 76a, said blade-mounting plates being respectively provided with blades 79, 79a and 80, 80a secured thereto. For operation, an external tube 84 is moved transversely (right and left in FIG. 14) by means of compressed air. FIGS. 14 and 13(b) show the state in which the external tube has come to its forward position and the material has been already cut off. When the direction of the air pressure is reversed by a signal, the external tube retires thereby to disengage the axles 74 and 74a from cams 75 and 75a and to open them under the action of a spring 82 (the distance between the ends of the blades is reduced). At the same time when pressure rolls 81 and 81a retire, the blades 79, 80 and 79a, 80a are opened to reach the positions shown in FIG. 13(a). For cutting, the operations are quite contrary; that is, the body 72 advances on a shaft 85 through the cam 25 (moves to a position where the molded product is cutoff), whereby, the blades are inserted between the bottoms of two molded products. When the external tube 84 advances with another signal, the blades are at first closed to some extent by means of the pressure rolls 81 and 81a. Then, the cam 75 pushes the axle 74, thereby to open the ends of the blades in the direction of arrow (D–Da) and to force the raised bottom of the container to be deformed. When the pressure rolls 81 and 81a further advance, force is applied to the blades 79, 80 and 79a, 80a in the form of a wedge, so that the extra material can be removed by cutting off.

Figure 16:
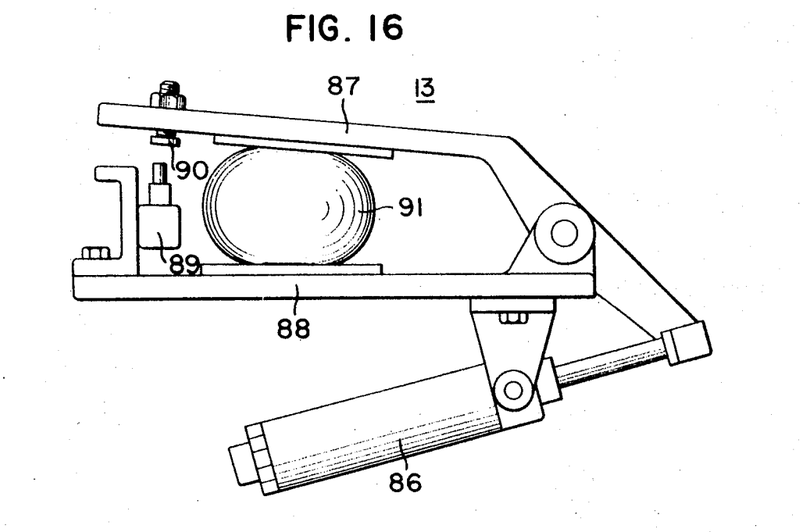
FIG. 16 is a schematic view of the pressing mechanism to be used in the invention.

The pinhole tester 13 is so constructed as shown in FIG. 16. The molded and sealed product 91 is compressed at its body for a determined time between a base 88 and a pressure plate 87 by means of compressed air applied to an air cylinder 86. The pressure of pinholes is judged from the displacement of the pressure plate 87. If any pinhole exists, a limit switch 89 is depressed for electrical control, thus permitting the product to be taken out into a different position. In order to be able to adjust said displacement and the testing time, a pressing piece 90 is made to be adjustable.

The detailed motions have been hereinbefore described. To explain the operations along the flow of the product, the mold 43 of the secondary rotary 2 opens at its contact point $i$ with the third rotary 3 and simultaneously therewith the nippers 20 and 21 close thereby to grasp the part of parison projecting from the mold used for transfer of the parison. When the bottom cutter 22 and the pinhole tester 13 have reached to a position $j$ free from any interference, the former 22 is advanced by means of the cam 25 and cut off the extra material at the bottom of the product. At the same time, the pinhole tester 13 advances to grasp the container at the body thereof and checks it for freedom from pinhole. Defective products are made to fall together with the scraps at the position $k$ and acceptable ones are made to fall down at the position $l$.

As apparent from the above description of an embodiment of the present invention, the present invention has the following effects, whereby the utilization rate of the material and the operational efficiency can be remarkably improved:

1. When the parison is held by one holder 4 in the stretched condition, the backward pairs of nippers of the holder is closely followed by the forward pair of nippers of the next holder. It follows from this that the parison is cut between both pairs of nippers located closely to each other, so that the wasted part of the parison is very small. These pairs of nippers may be arranged considerably near to each other. Even when the holders and molds are exchanged for making smaller bottles, the utilization rate of the material is far better than with the known arts. Accordingly, in the case of mass production of bottles or the like, the material cost can be greatly saved.

2. As the parison held in stretched state in the horizontal position is transfered, after being brought into vertical position, to the mold arranged vertically in the rotary molding machine, the operation of transferring the parison from one circular motion to another tangential thereto can be performed smoothly with no shock.

3. Since the parison of a length for one product is held by the holder 4 in the stretched condition, inserted into the mold and blow molded, removal of the extra part of the product and separation of the product from the mold are facilitated.

4. Since two containers are formed at a time by combining two molds with their container bottom-forming portions opposed to each other, the material wasted between two containers is very slight, thus enhancing the utilization rate of the material.

5. Similarly, the material wasted at the neck of the container can be also reduced.

6. The molding efficiency can be improved by arranging high frequency electrodes between two containers and sealing them by high frequency welding.

7. Since the blow pin is inserted between the bottoms of two containers, the hole made by the pin has not to be sealed, thus improving the operational efficiency.

8. After taken out of the container from the mold, extra parison of the molded container can be continuously and efficiently cut off from the raised bottom.

9. While the pinhole tester serves for checking the containers as to gastightness for purpose of preventing penetration of bacteria and foreign matters thereinto, it is also effective for prevention of leakage of filling drinks or the like, became the quality of sealing at the bottom of the container can be also judged by said tester.

We claim:

1. An apparatus for continuously manufacturing containers from a thermoplastic resin, comprising a parison-transferring rotary adapted to take the parison continuously from an extruder, said rotary comprising a base rotating around its center axis, several support rods projected laterally from said base and arranged at equal intervals around said base, a tube fitted loosely on each of said support rods and controlled for movement along said support rod and for rotation by 90° with respect to rotation of said base, connecting pieces fixed to the outer end of said tube so as to form a T-shaped, holding means comprising two pairs of nippers secured to both ends of said connecting pieces and adapted to be opened and closed in relation to the rotation of said base, and cutting blades provided on one of said pairs of the nippers located forward with respect to the direction of rotation of said base, whereby said forward pair of the nippers are made to grasp the parison to stretch it with the rotation of said base for moving said nippers at a linear velocity higher than that at which the parison is extruded from said extruder and then the backward pair of the nippers nips the parison and at the same time as this nipping the forward pair of nippers of the succeeding parison-holding means grasps the parison, said cutting blades being arranged so that the parison is cut off at a position between said both pairs of nippers, and said parison-holding means being constructed and arranged in such a manner that said holding means rotates by 90° after said cutting of the parison thereby to bring the cut and stretched parison held as above into parallel to the rotating axis of said base to insert it into one of two-piece split metal molds of the following blow-molding rotary, said molds being mounted in parallel to said rotary axis; and a blow-molding rotary comprising a rotating disc, several tightening devices arranged at equal intervals around said disc, said tightening device including said split mold constructed to have a form obtained by joining bottom portions of two containers, a blow pin adapted to be inserted between the bottoms of two containers to be formed, and nippers mounted on both ends of one split of said split mold in the direction at right angle with the split surface of the mold, said nippers being adapted to open when the mold is opened and close when the mold is closed thereby to compress the parts of the parison projecting from the ends of the mold; and means adapted to rotate synchronously and continuously said two rotaries.

2. An apparatus for continuously manufacturing containers from a thermoplastic resin, comprising a parison transferring rotary adapted to take the parison continuously from an extruder, said rotary comprising a base rotating around its center axis, several support rods projected laterally from said base and arranged at equal interval around said base, a tube fitted loosely on each of said support rods and controlled for movement along said support rod and for rotation by 90° with respect to rotation of said base, connecting pieces fixed to the outer end of said tube so as to form a T-shaped, holding means comprising two pairs of nippers secured to both ends of said connecting pieces and adapted to be opened and closed in relation to the rotation of said base, and cutting blades provided on one of said pairs of the nippers located forward with respect to the direction of rotation of said base, whereby said forward pair of the nippers are made to group the parison to stretch it with the rotation of said base for moving said nippers at a linear velocity higher than that at which the parison is extruded from said extruder and then the backward pair of the nippers nips the parison and at the same time as this nipping the forward pair of nippers of the succeeding parison-holding means grasps the parison, said cutting blades being arranged so that the parison is cut off at a position between said both pairs of nippers, and said parison holding means being constructed and arranged in such a manner that said holding means rotates by 90° after said cutting of the parison thereby to bring the cut and stretched parison held as above into parallel to the rotating axis of said base and to insert it into one of two-piece split metal molds of the following blow-molding rotary, said molds being mounted in parallel to said rotating axis; and a blow-molding rotary comprising a rotating disc, several tightening devices arranged at equal intervals around said disc, said tightening device including said split mold constructed to have a form obtained by joining bottom portions of two containers, a blow pin adapted to be inserted between the bottoms of two containers to be formed, and nippers mounted on both ends of one split of said split mold in the direction at right angle with the split surface of the mold, said nippers being adapted to open when the mold is opened and close when the mold is closed thereby to compress the parts of the parison projecting from the ends of the mold; a takeoff and trimming rotary comprising means for taking continuously and automatically the completed product, means for cutting off extra material at the bottom of the product, means for pressing central portion of the product thereby to check existence or nonexistence or pinhole, and means for sorting acceptable or not; and means adapted to rotate synchronously and continuously said rotaries.